United States Patent [19]

Daniel

[11] Patent Number: 5,540,459
[45] Date of Patent: Jul. 30, 1996

[54] ROOF RAIL MOUNTED AIRBAG ASSEMBLY

[75] Inventor: Roger P. Daniel, Dearborn, Mich.

[73] Assignee: Ford Motor Company, Dearborn, Mich.

[21] Appl. No.: 318,404

[22] Filed: Oct. 5, 1994

[51] Int. Cl.⁶ .................................................. B60R 21/22
[52] U.S. Cl. ................................................... 280/730.2
[58] Field of Search ..................... 280/728 R, 730 A, 280/730 R, 728.1, 730.2, 730.1

[56] References Cited

U.S. PATENT DOCUMENTS

| | | | |
|---|---|---|---|
| 3,733,088 | 5/1973 | Stephenson | 280/730 R |
| 3,917,023 | 11/1975 | De Rosa . | |
| 5,265,903 | 11/1993 | Kuretake et al. | 280/730 |
| 5,333,899 | 8/1994 | Witte | 280/730 A |
| 5,362,097 | 11/1994 | Barske | 280/730 A |

FOREIGN PATENT DOCUMENTS

| | | | |
|---|---|---|---|
| 2628815 | 5/1978 | Germany . | |
| 9211423 | 8/1992 | Germany . | |
| 3-258636 | 11/1991 | Japan | 280/730 A |
| 3-276844 | 12/1991 | Japan | 280/730 A |
| 2191450 | 12/1987 | United Kingdom | 280/730 R |

*Primary Examiner*—Karin L. Tyson
*Attorney, Agent, or Firm*—Daniel M. Stock; Roger L. May

[57] ABSTRACT

An inflatable restraint device is provided for an automotive vehicle for operation between the upper portion of the vehicle occupant and the vehicle side. The device 32 is an airbag assembly carried within and forming a structural part of the roof side rail 30 of the vehicle. The airbag assembly 32 includes an inflator housing 46 positioned within the roof side rail 30 and a trim cover 66 overlies the roof side rail and defines a downward facing passage 70 so that inflation of an airbag 66 effects downward opening of the airbag 60 between the occupant seat 26, the door 16 and window 17 of the vehicle.

7 Claims, 1 Drawing Sheet

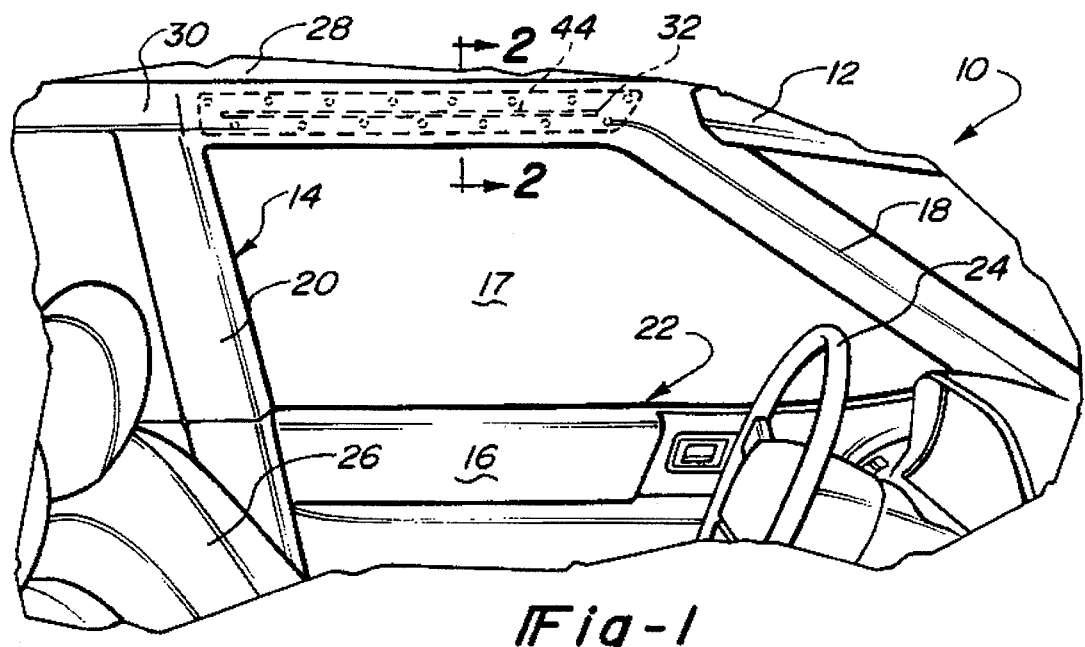
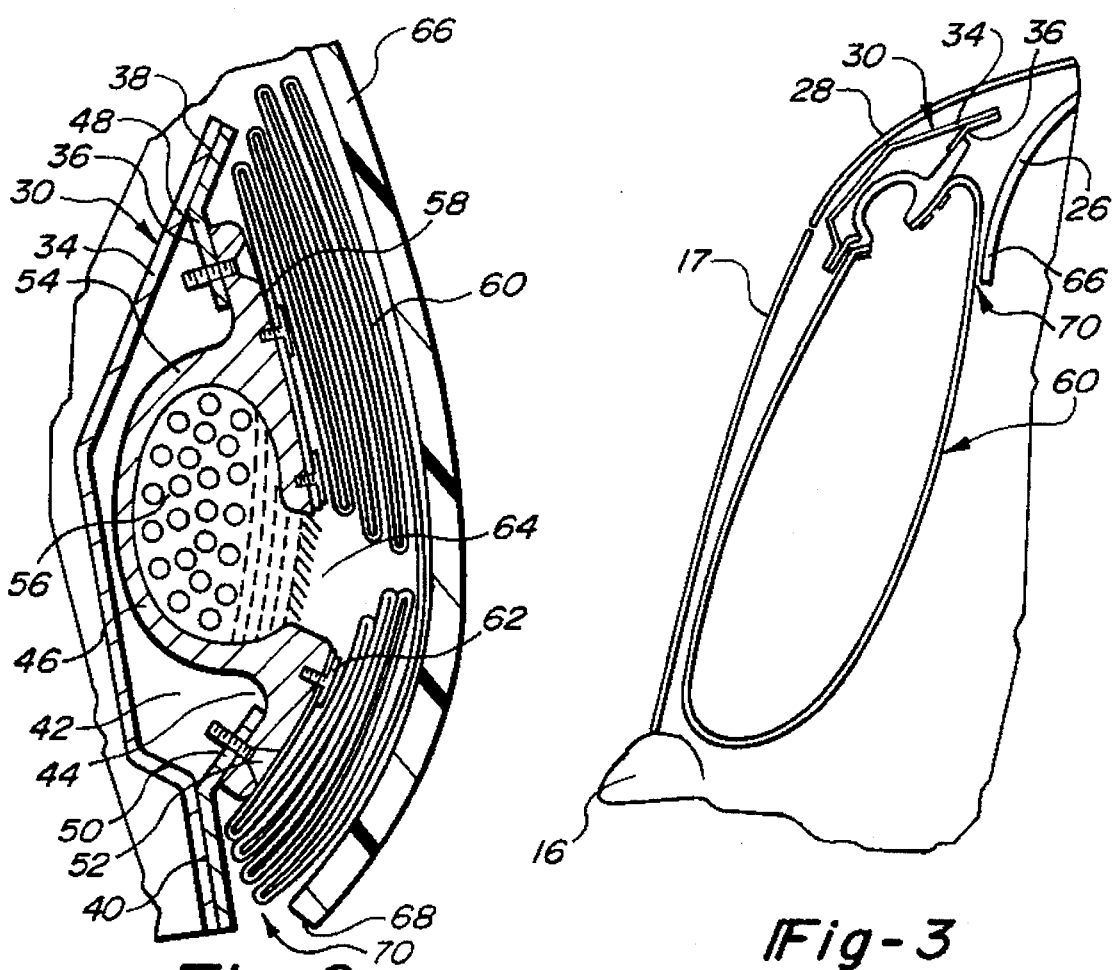

ROOF RAIL MOUNTED AIRBAG ASSEMBLY

BACKGROUND OF THE INVENTION

1. Technical Field

The present invention relates generally to inflatable occupant restraints for automotive vehicles, and more particularly to such restraints deployed on the sides of the vehicles.

2. Description of the Prior Art

The use of inflatable occupant restraints or airbags in automotive vehicles has become common in the automotive industry. Almost all inflatable occupant restraint systems presently available are configured to respond to frontal impacts. In response to changing governmental regulations and, more importantly, in order to enhance the energy absorbing capability of their products, the automotive industry has turned its attention to developing energy absorbing restraints responsive to excessive loading laterally of vehicles.

One of the areas of the vehicle under consideration for possible use of inflatable occupant restraints is the area between the upper portion of an occupant and the vehicle side glass. Japanese patent application 3-276844 to Mazda Motor Corporation is exemplary of one approach to providing airbags in the space adjacent the upper portion of a vehicle occupant in the front seat of a vehicle. It disadvantageously uses two airbags, one carried adjacent the roof of the vehicle and one carried in the center B-pillar of the vehicle, and both positioned on the outside of the adjacent body structure under a trim cover.

SUMMARY OF THE INVENTION

The disadvantages of the prior art devices are overcome in the present invention inflatable restraint device in which an airbag assembly is fixedly secured to the roof side rail of a vehicle and closes an aperture formed in the side rail to structurally complete it.

According to the present invention, a trim cover is positioned adjacent the side rail and overlies the inflatable airbag of the airbag assembly and defines a downwardly facing passage for directing the airbag between the occupant and the side of the vehicle.

It is a further advantage of the present invention that the single airbag assembly carried with the roof side rail is operative to deploy an airbag along the entire longitudinal extent of the passenger compartment, that is, the space occupied by the adjacent occupant.

BRIEF DESCRIPTION OF THE DRAWINGS

The foregoing and other advantages of the present invention may occur to those skilled in the vehicle occupant restraint arts upon reading the following description with reference to the accompanying drawings, in which:

FIG. 1 is an interior view of an automotive vehicle in which the inflatable restraint device of the present invention is installed.

FIG. 2 is a cross-sectional view taken along lines 2—2 of FIG. 1.

FIG. 3 is a diagrammatic cross-sectional view of the inflatable restraint device of the present invention in a deployed position.

DESCRIPTION OF THE PREFERRED EMBODIMENT

Turning now to the drawings, in particular to FIG. 1 thereof, an automotive vehicle 10 is illustrated as including a body 12 having a side wall 14. A door 16 with a window 17 acts as a closure panel with respect to the side wall 14 and is bounded on the forward end by an A-pillar 18 and on the rearward end by a B-pillar 20. The portion of the interior of the vehicle 10 in which a driver occupant is seated is illustrated in FIG. 1 as the passenger compartment indicated generally at 22 bounded generally by a steering wheel 24 and a seat 26. The passenger compartment 22 is vertically bounded on its top by a roof 28 as is conventional in vehicle body construction. A roof side rail 30 is fixedly secured to the roof 28 and to the body side 14, as is well-known in modern unibody construction. To provide an energy absorbing cushion between the passenger compartment 22 and the body side 14 and roof 28, an inflatable restraint device 32 is carried with the roof side rail 30.

Turning next to FIG. 2, the roof side rail 30 is illustrated as comprising an outer panel 34 and inner panel 36 which are preferably conventionally secured together, as by welding, at flanges 38, 40. The outer panel 34 is configured to be concave outward as best seen in FIG. 2, and the inner panel 36 is concave inward to define between the panels 34, 36 a chamber 42 which, in conventional construction, would define a box section.

According to the present invention, however, an elongated aperture 44 is provided through the inner panel 36 and the airbag assembly 32 overlies the aperture 44 to define a box section.

The airbag assembly 32 preferably includes an inflator housing 46 having mounting flanges 48, 50 which receive fasteners, such as the fasteners indicated typically at 52, to permit fixed securement of the inflator housing 46 to the inner panel 36. The inflator housing 46 includes a propellant boss 54 housing stored gas or a gas generant as indicated diagrammatically at 56. The boss 54 advantageously projects outwardly with respect to the inner panel 36 within the box section between the panels 34, 36 of the roof side rail 30. Secured to an outer face 58 of the inflator housing 46 is a conventional airbag, indicated generally at 60, which is secured in known fashion as by fasteners 62 to the housing 46.

The airbag 60 assumes a stored position in which it is folded concentrically about a discharge passage 64 from the inflator housing 46. Laterally inwardly of the airbag 60, a trim cover 66 is fixedly secured in a known manner, not shown, to a portion of the vehicle body 12 and is preferably formed of a flexible, resilient material such as a plastic. The trim panel 66 includes a lower edge 68 arranged in laterally spaced relationship with respect to the flange 40 to define a downwardly facing passage 70.

During an event in which operation of the airbag assembly 32 is effected, gases are generated or stored gases released through the discharge passage 64 into the airbag 60 to expand the airbag 60 from the stored condition shown in FIG. 2 to its inflated condition as shown in FIG. 3. During this inflation, the trim panel 66 flexes laterally inwardly, away from the roof side rail 30 to expand the passage 70 and permit the downward expansion of the airbag 60 substantially vertically spanning the window 17 adjacent the seat 26 and, because of the longitudinal dimensioning of the aperture 44, substantially filling the longitudinal extent of the passenger compartment 22 between the steering wheel 24 and the seat 26.

While only one embodiment of the inflatable restraint device of the present invention has been described or referred to herein, others may occur to those skilled in the automotive vehicle occupant restraint arts which do not depart from the scope of the following claims.

I claim:

1. In an automotive vehicle having a body including a passenger compartment extending longitudinally of the vehicle with an upper end bounded by a roof and a side bounded by a body side panel and having a longitudinally extending roof side rail having an inner wall and an outer wall together defining a box section and being fixedly secured to the roof and the body side panels, an inflatable restraint device, comprising:

means defining an elongated aperture through said side rail inner wall and into said box section, the aperture facing said passenger compartment; and an airbag assembly comprising a rigid housing having mounting flanges fixedly secured to said inner wall of said roof side rail adjacent said elongated aperture thereby effecting closure of said box section.

2. An inflatable restraint device as defined in claim 1, wherein said housing comprises an inflator portion received through said aperture and carried within said box section.

3. An inflatable restraint device as defined in claim 2, and further comprising a trim panel positioned between said roof side rail and said passenger compartment and having a lower edge.

4. An inflatable restraint device as defined in claim 3, and further comprising means defining a downwardly facing elongated passage between said trim panel lower edge and said roof side rail.

5. An inflatable restraint device as defined in claim 4, and further comprising an airbag folded in place in a stored position between said trim panel and said roof side rail adjacent said passage and expandable downwardly through said passage to an inflated position.

6. An inflatable restraint device as defined in claim 5, wherein said trim panel is formed as a resilient member operative to deflect away at its lower edge from said roof side rail as said airbag expands to said inflated position.

7. An inflatable restraint device as defined in claim 6, wherein said airbag covers said longitudinal extent of said passenger compartment when said airbag is in said inflated position.

* * * * *